United States Patent
Nagy

(10) Patent No.: US 6,498,221 B1
(45) Date of Patent: Dec. 24, 2002

(54) SINGLE-SITE CATALYSTS CONTAINING CHELATING N-OXIDE LIGANDS

(75) Inventor: Sandor Nagy, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/539,450

(22) Filed: Mar. 30, 2000

(51) Int. Cl.$^7$ .................................................. C08F 4/44
(52) U.S. Cl. ........................ 526/161; 526/170; 526/171; 526/134; 526/943; 556/51; 556/52; 502/103; 502/117
(58) Field of Search ................................ 526/160, 170, 526/943; 556/51; 502/103, 117

(56) References Cited

U.S. PATENT DOCUMENTS

| | | | |
|---|---|---|---|
| 3,865,892 A | * 2/1975 | Zuech .................... 260/683 D |
| 3,950,268 A | * 4/1976 | Karayannis et al. ........ 252/429 |
| 4,015,060 A | 3/1977 | Karayannis et al. ........ 526/141 |
| 4,189,556 A | * 2/1980 | Karayannis et al. ........ 526/141 |
| 4,247,480 A | 1/1981 | Murata et al. ............... 564/298 |
| 4,504,666 A | 3/1985 | Earl et al. ................... 546/345 |
| 4,504,667 A | * 3/1985 | Katz et al. .................. 546/345 |
| 4,748,275 A | 5/1988 | Smith et al. ................. 564/298 |
| 4,752,597 A | 6/1988 | Turner ......................... 502/104 |
| 4,791,180 A | 12/1988 | Turner ......................... 526/160 |
| 5,082,940 A | 1/1992 | Legrand et al. ............. 544/353 |
| 5,153,157 A | 10/1992 | Hlatky et al. ................ 502/117 |
| 5,198,401 A | 3/1993 | Turner et al. ............... 502/155 |
| 5,241,025 A | 8/1993 | Hlatky et al. ................ 526/129 |
| 5,244,987 A | * 9/1993 | Bernard et al. ............... 526/78 |
| 5,268,114 A | 12/1993 | Odorisio et al. ........... 252/51.5 |
| 5,461,126 A | * 10/1995 | Knudsen et al. .............. 526/96 |
| 5,539,124 A | 7/1996 | Etherton et al. ............. 548/402 |
| 5,554,775 A | 9/1996 | Krishnamurti et al. .......... 556/7 |
| 5,637,659 A | 6/1997 | Krishnamurti et al. ...... 526/133 |
| 5,637,660 A | * 6/1997 | Nagy et al. .................. 526/160 |
| 5,710,333 A | 1/1998 | Bäder et al. ................. 564/298 |
| 5,852,146 A | * 12/1998 | Reichle et al. ............... 526/172 |
| 5,902,866 A | 5/1999 | Nagy et al. .................. 526/133 |
| 5,955,633 A | 9/1999 | Prabhu ........................ 564/298 |
| 6,020,493 A | * 2/2000 | Liu ................................ 546/7 |
| 6,054,407 A | * 4/2000 | Schulz et al. ................ 502/155 |
| 6,255,415 B1 | * 7/2001 | Wang et al. ................. 526/132 |
| 6,281,308 B1 | * 8/2001 | Nagy et al. .................. 526/172 |

OTHER PUBLICATIONS

Urson et al., J. Organomet. Chem. 1982, 240, 429–439.*
Bortolini et al., J. Org. Chem. 1987, 52, 5467–5469.*
Tung et al., J. Am. Chem. Soc. 1992, 114, 3445–3455.*
Dyker, et al., Tetrahedron: Asymmetry 1999, 10, 3297–3307.*
Sharma et al. Bull. Chem. Soc. Fr. 1984, I–327.*
Mittal et al. J. Inst. Chemists (India) 1983, 55, 29.*
K. Goyal et al., *J. Indian Chem. Soc. LX* (1983) 399.
S. Sharma et al., *Bull. Chem. Soc. Fr.* (1984) I–327.
I. Mittal et al., *J. Inst. Chemists (India)* 55 (1983) 29.
J. Bjorgo et al., *J. Chem. Soc., Perkin Trans. I* (1977) 254.
H. Mitsui et al., *J. Chem. Soc., Chem. Commun.* (1984) 874.
M. Abou–Gharbia et al., *Synthesis* (1977) 318.
J. March, *Advanced Organic Chemistry*, $2^{nd}$ Ed. (1977) 1111.
*Org. Synth.*, Coll. vol. V (1973) 1124.
*Org. Synth.*, Coll. vol. IX (1998) 632.

* cited by examiner

*Primary Examiner*—David W. Wu
*Assistant Examiner*—Rip A. Lee
(74) *Attorney, Agent, or Firm*—Jonathan L. Schuchardt

(57) ABSTRACT

A single-site olefin polymerization catalyst and method of making it are disclosed. The catalyst comprises an activator and an organometallic complex. The complex comprises a Group 3 to 10 transition or lanthanide metal, M, and at least one chelating N-oxide ligand that is bonded to M. Molecular modeling results indicate that single-site catalysts based on certain chelating N-oxide ligands (e.g., 2-hydroxypyridine) will rival the performance of catalysts based on cyclopentadienyl and substituted cyclopentadienyl ligands.

7 Claims, No Drawings

SINGLE-SITE CATALYSTS CONTAINING CHELATING N-OXIDE LIGANDS

FIELD OF THE INVENTION

The invention relates to catalysts useful for olefin polymerization. In particular, the invention relates to "single-site" catalysts that incorporate at least one chelating N-oxide ligand.

BACKGROUND OF THE INVENTION

Interest in single-site (metallocene and non-metallocene) catalysts continues to grow rapidly in the polyolefin industry. These catalysts are more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Traditional metallocenes commonly include one or more cyclopentadienyl groups, but many other ligands have been used. Putting substituents on the cyclopentadienyl ring, for example, changes the geometry and electronic character of the active site. Thus, a catalyst structure can be fine-tuned to give polymers with desirable properties. Other known single-site catalysts replace cyclopentadienyl groups with one or more heteroatomic ring ligands such as boraaryl (see, e.g., U.S. Pat. No. 5,554,775), pyrrolyl, indolyl, (U.S. Pat. No. 5,539,124), or azaborolinyl groups (U.S. Pat. No. 5,902,866). Amine oxides are widely used in the polymer industry as stabilizers (see, for example, U.S. Pat. No. 5,268,114), and many are commercially available. Seldom, however, have amine oxides been used in a process for polymerizing olefins or as a component of an olefin polymerization catalyst. An exception is U.S. Pat. No. 4,015,060, which teaches to use sterically hindered heterocyclic amine oxides (such as pyridine N-oxide or 2,6-lutidine N-oxide) in combination with a Ziegler-Natta catalyst (titanium trichloride, a trialkyl aluminum, and a dialkyl aluminum halide) to polymerize propylene. The amine oxide reduces the amount of low-molecular-weight, alkane-soluble impurities in the desired product, crystalline polypropylene.

In contrast, single-site olefin polymerization catalysts that contain N-oxide ligands are not known. Also unknown are catalysts that incorporate a chelating N-oxide ligand, i.e., one that can form a chelate using the N-oxide oxygen atom and a second atom that can donate an electron pair to the transition metal.

The commercial availability of many N-oxides and the ease with which a host of other interesting N-oxide ligands can be prepared (e.g., by simply oxidizing the corresponding tertiary amine with hydrogen peroxide or a peracid) suggests that single-site catalysts with advantages such as higher activity and better control over polyolefin properties are within reach. Ideally, these catalysts would avoid the all-too-common, multi-step syntheses from expensive, hard-to-handle starting materials and reagents.

SUMMARY OF THE INVENTION

The invention is a single-site olefin polymerization catalyst. The catalyst comprises an activator and an organometallic complex. The organometallic complex comprises a Group 3 to 10 transition or lanthanide metal, M, and at least one chelating N-oxide ligand that is bonded to M.

Evidence from molecular modeling studies suggests that single-site catalysts based on chelating N-oxide ligands (e.g., 2-hydroxypyridine N-oxide) will rival the performance of catalysts based on cyclopentadienyl and substituted cyclopentadienyl ligands.

The invention includes a simple synthetic route to the single-site olefin polymerization catalysts. The ease and inherent flexibility of the synthesis puts polyolefin makers in charge of a new family of single-site catalysts.

DETAILED DESCRIPTION OF THE INVENTION

Catalysts of the invention comprise an activator and an organometallic complex. The catalysts are "single site" in nature, i.e., they are distinct chemical species rather than mixtures of different species. They typically give polyolefins with characteristically narrow molecular weight distributions (Mw/Mn<3) and good, uniform comonomer incorporation.

The organometallic complex includes a Group 3 to 10 transition or lanthanide metal, M. More preferred complexes include a Group 4 to 6 transition metal; most preferably, the complex contains a Group 4 metal such as titanium or zirconium.

The organometallic complex also comprises at least one chelating N-oxide ligand that is bonded to the metal. By "chelating," we mean that the ligand can bind to a transition metal using the oxygen atom of the amine oxide and one other atom that can donate an electron pair to the metal. The other atom is preferably separated from the amine oxide oxygen by 2 to 5 atoms. The other electron-donating atom can be neutral (as in a hydroxyl, alkoxy, or amino group) or anionic (as in a deprotonated hydroxyl, deprotonated amine, or carbanion). In preferred chelating N-oxide ligands, the electron-donating atom is anionic. In other words, the ligand is preferably deprotonated before incorporating it into the transition metal complex. The electron-donating atom can be oxygen, nitrogen, sulfur, phosphorus, or carbon.

A preferred class of chelating N-oxide ligands are heterocyclic aromatic amine oxides that have an electron-donating atom ortho to the amine oxide nitrogen. Deprotonation of these ligands generates a resonance-stabilized anion. Ligands in this group include, for example, N-substituted imidazole N-oxides, pyridine N-oxides, and lutidine N-oxides that have an electron-donating group in the ortho position. Examples include 2-hydroxy-1-methylimidazole N-oxide, 2-hydroxypyridine N-oxide, 2-hydroxyquinoline N-oxide, 2-hydroxy-4,6-dimethyllutidine N-oxide, 2-(N'-methylamino)pyridine N-oxide, 2-(2-phenethyl-2-oxo)pyridine N-oxide, and the like. Also suitable are heterocyclic amine oxides having an electron-donating atom within 3 atoms of the amine oxide nitrogen. An example is 8-hydroxyquinoline N-oxide.

Other aliphatic and cycloaliphatic amine oxides having electron donor groups are also suitable because of their ability to stabilize the transition metal in an active single-site complex. Examples are N-hydroxyethyl-N,N-dibutylamine N-oxide, N-hydroxyethyl-N,N-diphenylamine N-oxide, N-methyl(2-hydroxymethyl)piperidine N-oxide, N-methoxyethyl-N,N-dimethylamine N-oxide, and the like.

The amine oxides are conveniently prepared by oxidizing the corresponding tertiary amines with hydrogen peroxide or a peroxyacid in aqueous or organic media according to well-known methods. See, for example, U.S. Pat. Nos. 5,955,633, 5,710,333, 5,082,940, 4,748,275, 4,504,666, and 4,247,480, the teachings of which are incorporated herein by reference.

Suitable chelating N-oxides also include those prepared by oxidizing a nitrogen of the corresponding imines (R—N=CR'R") or azo compounds (R—N=N—R') that have an electron donor group within 5 atoms of the N-oxide oxygen. In the formulas, R and R' are alkyl, aryl, or aralkyl (preferably both aryl) groups, and R" is hydrogen or an alkyl, aryl, or aralkyl group. Examples from these groups are azobis(2-hydroxybenzene) N-oxide (I) and benzophenone N-(2-hydroxyphenyl)imine N-oxide (II):

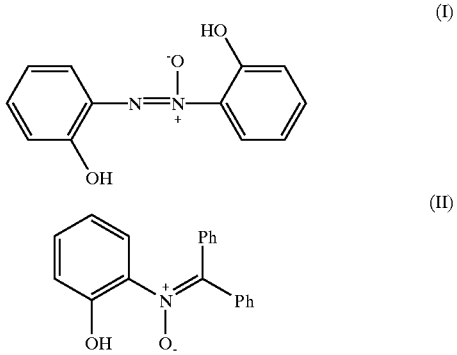

More precisely, compound (I) is an "azoxybenzene" (see J. March, *Advanced Organic Chemistry*, $2^{nd}$ ed., (1977) p. 1111) and compound (II) is a "nitrone." Nitrones are conveniently prepared by condensing aldehydes (e.g., benzaldehyde) and hydroxylamines (e.g., N-phenylhydroxylamine) as shown in *Organic Syntheses, Coll. Vol. V*, p. 1124. Nitrones can also be made by imine oxidation using a peroxyacid (*J. Chem. Soc., Perkin Trans. I* (1977) 254), by hydrogen peroxide oxidation of secondary amines in the presence of aqueous sodium tungstate (*Org. Synth., Coll. Vol. IX*, p. 632 and *J. Chem. Soc., Chem. Commun.* (1984) 874), and by imine oxidation with N-methylhydroxylamine-O-sulfonic acid (*Synthesis* (1977) 318).

The organometallic complex optionally includes one or more additional polymerization-stable, anionic ligands. Examples include substituted and unsubstituted cyclopentadienyl, fluorenyl, and indenyl, or the like, such as those described in U.S. Pat. Nos. 4,791,180 and 4,752,597, the teachings of which are incorporated herein by reference. A preferred group of polymerization-stable ligands are heteroatomic ligands such as boraaryl, pyrrolyl, indolyl, quinolinyl, pyridinyl, and azaborolinyl as described in U.S. Pat. Nos. 5,554,775, 5,539,124, 5,637,660, and 5,902,866, the teachings of which are incorporated herein by reference. Suitable polymerization-stable ligands include indenoindolyl anions such as those described in PCT publication WO 99/24446. The organometallic complex also usually includes one or more labile ligands such as halides, alkyls, alkaryls, aryls, dialkylaminos, or the like. Particularly preferred are halides, alkyls, and alkaryls (e.g., chloride, methyl, benzyl).

The chelating N-oxide ligands and/or polymerization-stable ligands can be bridged. For instance, a —CH$_2$—, —CH$_2$CH$_2$—, or (CH$_3$)$_2$Si bridge can be used to link two chelating N-oxide ligands or an N-oxide ligand and a polymerization-stable ligand. Groups that can be used to bridge the ligands include, for example, methylene, ethylene, 1,2-phenylene, and dialkyl silyls. Normally, only a single bridge is included. Bridging changes the geometry around the transition or lanthanide metal and can improve catalyst activity and other properties such as comonomer incorporation.

Exemplary organometallic complexes:

zirconium(2-oxypyridine N-oxide)trichloride,
titanium(2-oxypyridine N-oxide)trimethyl,
zirconium bis(8-oxyquinoline N-oxide)dichloride,
zirconium bis(2-(N'-methylamido)pyridine N-oxide) dichloride,
hafnium(N-(2-oxyethyl)-N,N-di-n-butylamine N-oxide) trichloride
zirconium(2-oxymethyl-N-methylpiperidine N-oxide) trichloride
titanium(2-oxypyridine N-oxide)tribenzyl
zirconium(1-methylborabenzene)(2-oxypyridine N-oxide) dichloride
zirconium(cyclopentadienyl)(2-oxypyridine N-oxide) dimethyl and the like.

The catalysts include an activator. Suitable activators ionize the organometallic complex to produce an active olefin polymerization catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl)borate, lithium tetrakis(pentafluorophenyl)aluminate, anilinium tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference.

The amount of activator needed relative to the amount of organometallic complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 0.1 to about 500 moles, of aluminum per mole of M. When the activator is an organoborane or an ionic borate or aluminate, the amount used will be within the range of about 0.01 to about 5000 moles, preferably from about 0.1 to about 500 moles, of activator per mole of M.

If desired, a catalyst support such as silica or alumina can be used. However, the use of a support is generally not necessary for practicing the process of the invention.

The invention includes methods for making the organometallic complex. One method comprises deprotonating a chelating N-oxide anion precursor with at least one equivalent of a potent base such as lithium diisopropylamide, n-butyllithium, sodium hydride, a Grignard reagent, or the like. The resulting anion is reacted with a Group 3 to 10 transition or lanthanide metal source to produce an organometallic complex. The complex comprises the metal, M, and at least one chelating N-oxide ligand that is bonded to the metal. Any convenient source of the Group 3 to 10 transition or lanthanide metal can be used. Usually, the source is a complex that contains one or more labile ligands that are easily displaced by the N-oxide anion. Examples are halides (e.g., $TiCl_4$, $ZrCl_4$), alkoxides, amides, and the like. The metal source can incorporate one or more of the polymerization-stable anionic ligands described earlier. The organometallic complex can be used "as is." Often, however, the complex is converted to an alkyl derivative by treating it with an alkylating agent such as methyl lithium. The alkylated complexes are more suitable for use with certain activators (e.g., ionic borates).

The N-oxide anion is preferably generated at low temperature (0° C. to –100° C.), preferably in an inert solvent (e.g., a hydrocarbon or an ether). The anion is then usually added to a solution of the transition or lanthanide metal source at low to room temperature. After the reaction is complete, by-products and solvents are removed to give the desired transition metal complex.

Some N-oxide ligands are nucleophilic enough to form suitable complexes without deprotonation. Much will depend upon the specific transition metal used, the other ligands, the reaction conditions used to make the complex, and other factors. In one suitable approach, a chelating N-oxide compound that contains a labile hydrogen (e.g., 2-hydroxypyridine N-oxide) reacts directly with an alkyl-substituted transition metal complex (e.g., tetrabenzylzirconium) or with a metal halide complex (e.g., cyclopentadienylzirconium trichloride) in the presence of an acid scavenger such as triethylamine.

The catalysts of the invention are particularly valuable for polymerizing olefins. Preferred olefins are ethylene and $C_3$–$C_{20}$ α-olefins such as propylene, 1-butene, 1-hexene, 1-octene, and the like. Mixtures of olefins can be used. Ethylene and mixtures of ethylene with $C_3$–$C_{10}$ α-olefins are especially preferred.

Many types of olefin polymerization processes can be used. Preferably, the process is practiced in the liquid phase, which can include slurry, solution, suspension, or bulk processes, or a combination of these. High-pressure fluid phase or gas phase techniques can also be used. The process of the invention is particularly valuable for solution and slurry processes. Suitable methods for polymerizing olefins using the catalysts of the invention are described, for example, in U.S. Pat. Nos. 5,902,866, 5,637,659, and 5,539,124, the teachings of which are incorporated herein by reference.

The olefin polymerizations can be performed over a wide temperature range, such as about –30° C. to about 280° C. A more preferred range is from about 30° C. to about 180° C.; most preferred is the range from about 60° C. to about 100° C. Olefin partial pressures normally range from about 15 psia to about 50,000 psia. More preferred is the range from about 15 psia to about 1000 psia.

Catalyst concentrations used for the olefin polymerization depend on many factors. Preferably, however, the concentration ranges from about 0.01 micromoles per liter to about 100 micromoles per liter. Polymerization times depend on the type of process, the catalyst concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

Preparation of Zirconium(2-oxypyridine N-oxide) Trichloride

Commercially available 2-hydroxypyridine N-oxide (1.0 g, 9.0 mmol) in diethyl ether (25 mL) is deprotonated by careful addition of n-butyllithium (6.25 mL of 1.6 M solution in hexanes, 10 mmol) at –78° C. The resulting anion is separated from excess salts by filtration in vacuo.

The pyridinoxy anion solution is added by cannula to a stirred slurry of zirconium tetrachloride (2.05 g, 8.8 mmol) in diethyl ether (25 mL) at –78° C. The reaction mixture is stirred and allowed to warm to room temperature. Volatiles are removed in vacuo. The residue is extracted with toluene to give a solution of the organometallic complex. This solution can be used "as is" for polymerizing olefins. The expected product is zirconium(2-oxypyridine N-oxide) trichloride.

Additional evidence for the suitability of chelating N-oxides as ligands for single-site catalysts comes from molecular modeling studies. For example, using molecular orbital calculations at the PM3tm (Spartan software distributed by Wavefunction, Inc.), we found that zirconocenium active sites based on the anion derived from 2-hydroxypyridine N-oxide have calculated reactivity indices (e.g., hardness and electrophilicity) that are remarkably similar to the values calculated for traditional ligands based on cyclopentadienyl anions. The model calculations suggest that the electronic and steric environments of certain chelating N-oxides make them an excellent choice as ligands for single-site catalysts.

The preceding examples are meant only as illustrations. The following claims define the invention.

I claim:
1. A catalyst which comprises:
   (a) an activator selected from the group consisting of alumoxanes, alkylaluminum compounds, organoboranes, ionic borates, and ionic aluminates; and
   (b) an organometallic complex comprising a Group 3 to 10 transition or lanthanide metal, M, and at least one chelating N-oxide that is bonded to M; wherein the complex further comprises a polymerization-stable, anionic ligand selected from the group consisting of boraaryl, pyrrolyl, indolyl, quinolinyl, pyridinyl, indenoindolyl, and azaborolinyl.

2. The catalyst of claim 1 comprising a Group 4 transition metal.

3. A catalyst which comprises:
   (a) an activator selected from the group consisting of alumoxanes, alkylaluminum compounds, organoboranes, ionic borates, and ionic aluminates; and
   (b) an organometallic complex comprising a Group 3 to 10 transition or lanthanide metal, M, and at least one chelating N-oxide that is bonded to M; wherein the chelating N-oxide is a heterocyclic amine oxide having an electron-donating atom ortho to the amine oxide nitrogen.

4. The catalyst of claim 3 wherein the chelating N-oxide is selected from the group consisting of N-substituted imidazole N-oxides, pyridine N-oxides, and lutidine N-oxides.

5. A catalyst which comprises:
   (a) an activator selected from the group consisting of alumoxanes, alkylaluminum compounds, organoboranes, ionic borates, and ionic aluminates; and
   (b) an organometallic complex comprising a Group 3 to 10 transition or lanthanide metal, M, and at least one chelating N-oxide that is bonded to M; wherein the chelating N-oxide is an aliphatic or cycloaliphatic amine oxide having an electron donor group.

6. The catalyst of claim 5 wherein the chelating N-oxide is selected from the group consisting of N-hydroxyethyl-N,N-dibutylamine N-oxide, N-hydroxyethyl-N,N-diphenylamine N-oxide, N-methyl(2-hydroxymethyl)piperidine N-oxide, and N-methoxyethyl-N,N-dimethylamine N-oxide.

7. A catalyst which comprises:
(a) an activator selected from the group consisting of alumoxanes, alkylaluminum compounds, organoboranes, ionic borates, and ionic aluminates; and
(b) an organometallic complex comprising a Group 3 to 10 transition or lanthanide metal, M, and at least one chelating N-oxide that is bonded to M; wherein the chelating N-oxide is an azoxybenzene or nitrone having an electron donor group within 5 atoms of the N-oxide oxygen.

* * * * *